June 15, 1926.                J. HAUVETTE-MICHELIN                1,589,301
                                    TIRE FLAP
                               Filed March 18, 1926
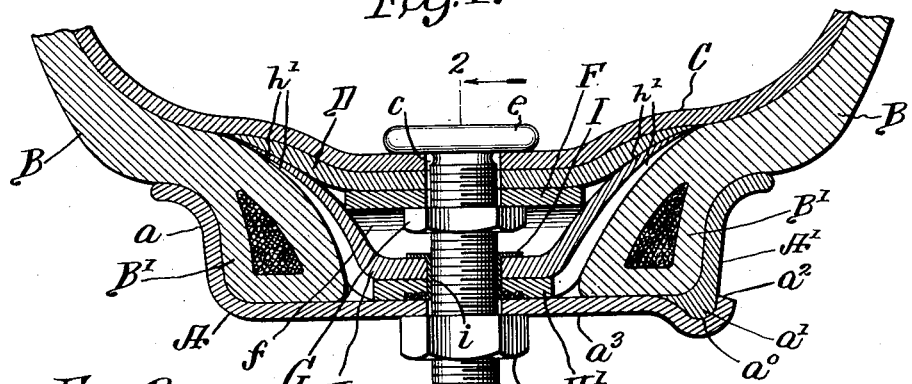
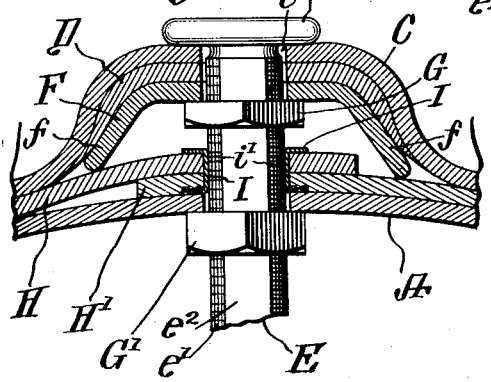
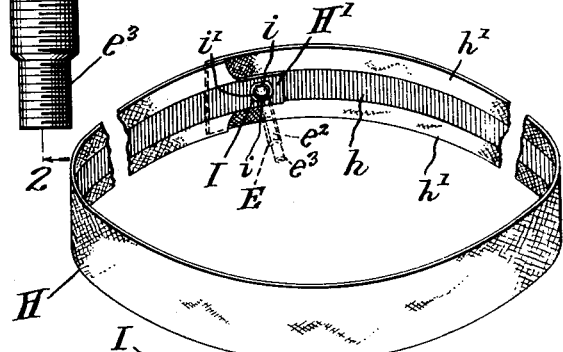
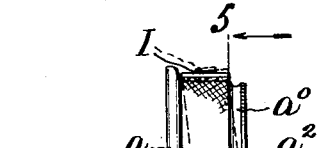
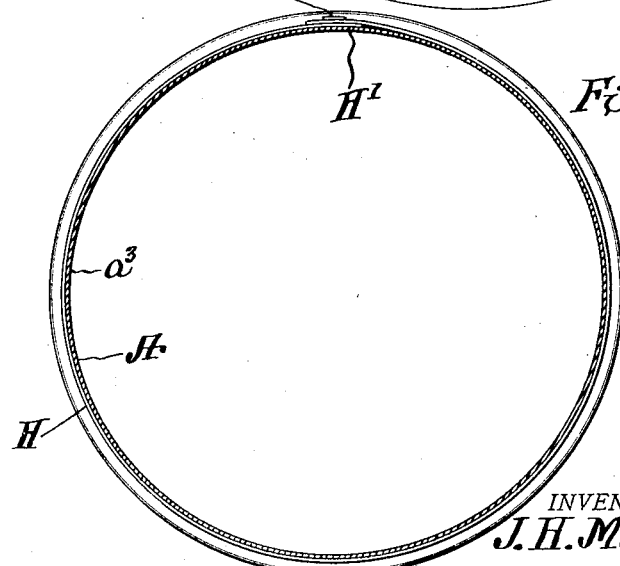
INVENTOR
J. H. Michelin
by Wilkinson & Fuesta
ATTORNEYS.

Patented June 15, 1926.

1,589,301

UNITED STATES PATENT OFFICE.

JULES HAUVETTE-MICHELIN, OF NEW BRUNSWICK, NEW JERSEY.

TIRE FLAP.

Application filed March 18, 1926. Serial No. 95,702.

My present invention relates to improvements in tire flaps, and is intended to cover a modification of, or an improvement in the structure illustrated and described in my United States Patent No. 1,575,479, granted March 2, 1926, and entitled "Improvements in tire flaps".

The structure shown in that patent was specially adapted for use with rims of the clincher type or with similar rims composed of a single metal band, trough shaped in cross section, whereas my present invention is adapted for use with rims having one side removable, so that the tire flap may be made in the form of a closed band, and slipped over the rim edgewise, like a washer or collar.

As was explained in that patent, a tire flap, as generally used, is a long strip made of several plies of duck and rubber, thick in the middle and tapering off to a thin edge on both sides. It is the general practice to cut a round hole at one end of the flap and an oblong hole at the other end, so as to hook the flap over the tire valve to hold it in place. The flap is used for the protection of the inner tube against rust that accumulates on the rim and also to prevent the inner tube from being pinched between rim and beads of casing.

It has been found that the holes at each end of a flap do not resist the strain on the flap caused by sudden braking or abrupt starting of the car, or when running with low inflation. These actions tend to cause the ends of the flap to move out of their place and to slip up on one side or other of the casing. The inner tube is thereby exposed to the base of the bead of the casing and subject to be pinched between the bead and rim.

It has also been found that due to the holes, which are merely punched in the soft material of the flap, a fixed length between holes is difficult to determine. Therefore, one hole is sometimes made oblong to compensate for a variation in length. However, when such a flap is placed in a casing, it easily happens that on account of its excess length, it may be placed badly in that it is pushed too much to one side and thus allows the inner tube to be exposed in the opposite side, and subject to injury. A further disadvantage of the common flap is the length which has to be allowed at each end to reinforce it. This makes it necessary to overlap the ends of the flap for a comparatively long distance. This overlap results in double thickness for this section which tends to injure the tube and casing.

It has also been found that the flap has a tendency to cross its ends instead of remaining in its proper alignment. When the ends are crossed in such a manner, the flap, further back, slips up on one side and exposes the inner tube.

In order to avoid these and other objections encountered in the use of flaps as now ordinarily constructed, I provide an improved construction, which will be more fully understood after reference to the accompanying drawings, in which like parts are indicated by similar reference symbols throughout the several views, and in which—

Figure 1 shows a cross section through the rim and beads of a tire at the point where the valve stem passes and shows the valve stem in elevation;

Figure 2 is a similar view to Figure 1, showing a section along the line 2—2 of Figure 1, and looking in the direction of the arrows;

Figure 3 is a perspective view of a complete flap as detached from the tire, parts being broken away, and the valve stem being indicated in dotted lines;

Figure 4 shows diagrammatically the manner of assembling the flap in the rim; and Figure 5 shows a section along the line 5—5 of Figure 1, and looking in the direction of the arrows.

A represents a rim, which may be of any of the well known constructions, in which one of its sides $a$ is integral with the body of the rim, and the other side A' is removable, this side A' preferably having a boss $a'$, fitting in a groove $a^0$ in the main body of the rim, as shown in Fig. 1. Adjacent said groove $a^0$, the edge $a^2$ is about the same or slightly less diameter than the cylindrical bearing surface $a^3$ of the metal rim A.

B represents the tire shoe or casing, which, as shown in Fig. 1, is of the well known straight side type, having the reinforced bead B'. The invention, however, does not depend upon the construction of the tire casing, as it may be used in conjunction with any well known form of tire casing.

C represents the inner tube, which is also constructed in the usual or any well known way. This inner tube is provided with the usual opening c for the valve stem, and the inner tube is strengthened adjacent to said opening by the reinforcing patch D, shown in Figs. 1 and 2.

E represents the valve stem, which is provided with the usual rounded head e and with the interrupted screw threads e', between which screw threads the valve stem is provided with flat sides $e^2$, as shown in Fig. 2. The end of the valve stem is cylindrical as at $e^3$ and is provided with screw threads to engage the cap, not shown.

Mounted on the valve stem and engaging the patch D is the curved metallic plate or bridge F having inwardly projecting curved arms f, which bridge serves to protect the inner tube against injury by or contact with the locking nut G holding the valve stem in an air-tight position with regard to the inner tube.

When assembled on the tire, the valve stem is secured in place by means of one or more nuts G'.

The aforementioned parts are all of the present or well known construction and do not constitute in themselves a part of my invention, which invention relates more especially to the flap H, which is made of a strip or band of flexible material, such as canvas or the like, which is preferably thickened and coated with rubber at the center as at h and tapered at the sides as at h', as shown most clearly in Figs. 1 and 3.

Near one end of the strip, its sides are cut away to form a tongue H', see Fig. 3. I secure this tongue to the opposite end of the strip by means of a metal eyelet I, see Figs. 1, 2 and 3. The slot through this eyelet is constructed with flattened sides i to engage the flattened sides $e^2$ of the valve stem, and with rounded ends i' to fit snugly against the screw-threaded portions e' of the valve stem, so that the valve stem, when inserted, will fit snugly in the slot in the eyelet and will lock the tongue H' and the adjacent end of the flap against lateral twisting when the flap is being put in place, as will be hereinafter more fully described. Thus, when the flap is completed, it will be in the form of a closed collar or band, whose diameter is such that the band will fit snugly over the tire seat $a^3$ of the rim. The rims being of standard sizes, the flap bands may be also constructed to fit snugly on the rims and to be readily attached to or removed therefrom, as will now be described.

In assembling the parts, the ring A' is removed from the side of the rim and that side of the tire containing the valve stem is slipped over the rim and the valve stem is inserted in the usual way. The other side of the tire is slipped into place on the rim in the usual way, the flap band being slipped into place, as indicated in dotted lines in Fig. 4. The slight elasticity of the flap band will render it possible to slip it into place very conveniently, and while the parts are being assembled, the valve stem will lock the adjacent ends of the flap against lateral twisting, as hereinbefore described.

It will be seen that the overhanging bridge F will prevent the inner tube from coming in contact with the eyelet I when the tire is mounted on the wheel.

By using the tongue H' at one end of the flap, as shown, there is very little overlapping of the sides of the flap, and the major portion of this overlap is beneath the bridge.

Obviously, the overlap of the flap is to be avoided, if possible, as injurious to the casing and tube.

By using the peculiar shaped metallic eyelet at the joint of the flap, not only are wrinkles and folds avoided, but the reinforced holes in the flap do not tear so readily.

Having thus described my invention, what I claim and desire to secure by Letters Patent of the United States is:

1. A flap for use with a pneumatic tire, having an inner tube and a valve stem, composed of a continuous band formed of a strip of flexible material having the sides at one end cut away to form a central tongue, with a metal eyelet securing said tongue and the other end of said strip together, said eyelet being adapted to slip over the valve stem of the inner tube, substantially as and for the purposes described.

2. A flap for use with a pneumatic tire, having an inner tube and a valve stem with flattened sides, composed of a continuous band formed of a strip of flexible material having the sides at one end cut away to form a central tongue, with a metal eyelet securing said tongue and the other end of said strip together, in order to maintain the proper length of the flap, said eyelet having an opening therein with parallel side walls, adapted to slip over and fit snugly the valve stem of the inner tube, and said parallel sides engaging the flat sides of the valve stem, substantially as and for the purposes described.

3. In a pneumatic tire, the combination with an inner tube and a valve stem therefor having flattened sides, and a curved bridge carried by said valve stem, of a flap, composed of a continuous band formed of a strip of flexible material thickened in its center and tapering in thickness towards the sides, the said sides being cut away at one end to leave a central tongue, and said tongue and the opposite end of the strip being secured together with a metal eyelet, adapted to slip over said valve stem, said eyelet having an opening therein, the side walls of said opening being parallel to each other to engage the flat side walls of said valve stem, and said bridge being adapted to project between said eyelet and the inner tube, substantially as and for the purposes described.

4. In a pneumatic tire, the combination with an inner tube and a valve stem therefor, and a curved bridge carried by said valve stem, of a flap composed of a continuous band formed of a strip of flexible material thickened in its center and tapering in thickness towards the sides, the said sides being cut away at one end to leave a central tongue, and said tongue and the opposite end of the strip being secured together with a metal eyelet, adapted to slip over said valve stem, and said bridge being adapted to project between said eyelet and the inner tube, substantially as and for the purposes described.

JULES HAUVETTE-MICHELIN.